United States Patent [19]

DiDomizio, Jr.

[11] 4,353,525
[45] Oct. 12, 1982

[54] ROTARY VALVE SEAL

[75] Inventor: Robert A. DiDomizio, Jr., Lansdale, Pa.

[73] Assignee: Honeywell Inc., Minneapolis, Minn.

[21] Appl. No.: 288,436

[22] Filed: Jul. 29, 1981

[51] Int. Cl.³ .............................................. F16K 1/28
[52] U.S. Cl. ..................................... 251/174; 251/306
[58] Field of Search ................ 251/305, 306, 174, 315

[56] References Cited
U.S. PATENT DOCUMENTS

| 2,520,288 | 8/1950 | Shand et al. | 251/174 |
| 2,661,926 | 12/1953 | Resek | 251/174 |
| 2,685,427 | 8/1954 | Bugg | 251/315 |
| 2,893,682 | 7/1959 | Hintzman et al. | 251/173 |
| 3,260,496 | 7/1966 | Borcherdt | 251/174 |
| 3,401,914 | 9/1968 | Shand | 251/174 |
| 3,414,233 | 12/1968 | Priese | 251/315 |
| 3,570,811 | 3/1971 | Kruschik | 251/174 |
| 3,677,514 | 7/1972 | Mencarelli | 251/174 |
| 3,712,585 | 1/1973 | Grenier | 251/174 |
| 4,020,864 | 5/1977 | Church, Jr. | 251/174 |
| 4,106,751 | 8/1978 | Niskin | 251/174 |
| 4,230,139 | 10/1980 | Scaramucci | 251/306 |

FOREIGN PATENT DOCUMENTS

| 849339 | 7/1952 | Fed. Rep. of Germany | 251/174 |
| 978601 | 12/1964 | United Kingdom | 251/174 |
| 1050982 | 12/1966 | United Kingdom | 251/306 |

Primary Examiner—H. Jay Spiegel
Attorney, Agent, or Firm—Lockwood D. Burton; Mitchell J. Halista

[57] ABSTRACT

A rotary valve has a fluid seal ring which is loosely captured within a valve body and provides a fluid seal at a peripheral edge of a movable member selectively positionable in a fluid conduit. The seal ring has an annular coaxial recess located on an inner side face thereof. A fixed valve seat member retained in the valve body coaxially with the seal ring has an outwardly projecting cantilever beam in the form of an integral annular ring located on a side face thereof. The end of the cantilever beam is provided with a tapered face arranged to cooperate with a tapered wall surface defining a side of the recess within the seal ring. The contact between the tapered side face of the cantilever beam and the tapered recess surface provides a fluid seal which is selectively positionable along the tapered recess surface to permit a self-aligning action of the seal ring to accommodate varying mechanical eccentricities of the seal ring in its fluid sealing position.

10 Claims, 2 Drawing Figures

4,353,525

ROTARY VALVE SEAL

BACKGROUND OF THE INVENTION

Field of the Invention

The present invention is directed to valves. More specifically, the present invention is directed to a fluid seal for a rotary valve.

SUMMARY OF THE INVENTION

An object of the present invention is to provide an improved fluid seal for a rotary valve.

In accomplishing this and other objects, there has been provided, in accordance with the present invention a seal for a rotary valve to provide a fluid seal with a selectively positionable valve closure member in a fluid passage within the body of the rotary valve. A valve seal ring has a first side face contacting a peripheral edge of the closure member in a valve closed state of the closure member and a second side face having a tapered wall recess. An annular valve seat located adjacent to the seal ring has an outwardly extending coaxial annular rib in the form of a cantilever beam having a tapered surface at a free end thereof. A contact between the tapered wall and the tapered surface provides a selectively positionable fluid-tight seal.

BRIEF DESCRIPTION OF THE DRAWING

A better understanding of the present invention may be had when the following detailed description is read in connection with the accompanying drawings, in which.

DESCRIPTION OF THE PREFERRED EMBODIMENT

Figure 1:
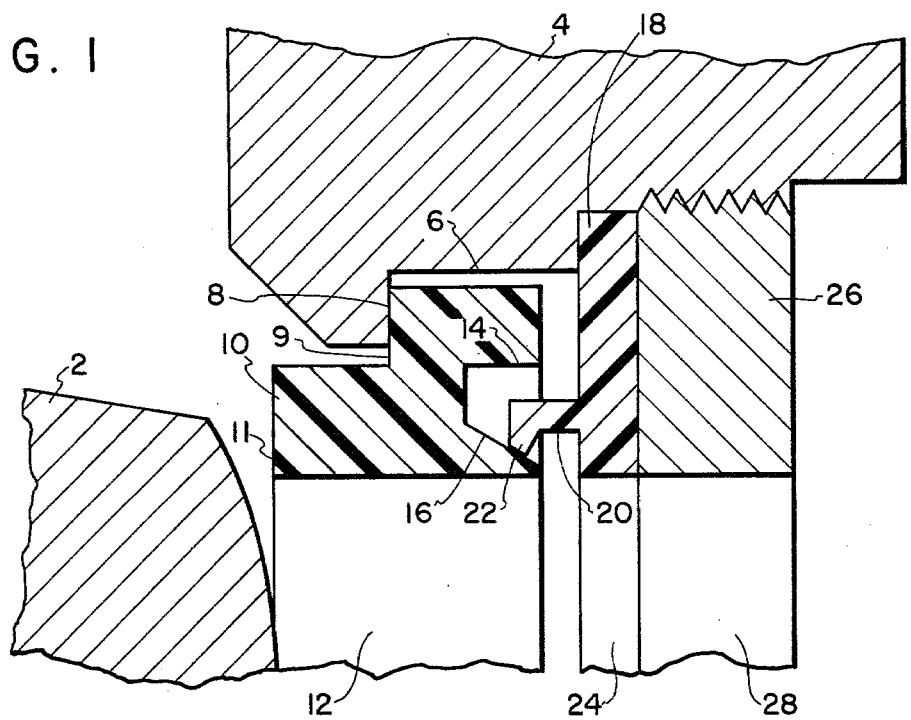
FIG. 1 is a cross-sectional illustration of an example of a valve seal embodying the present invention and showing the valve during a fluid sealing operation and FIG. 2 is a cross-sectional illustration of the valve seal shown in FIG. 1 at the conclusion of the valve sealing operation.

Referring to the figures in more detail, there is shown an example of a fluid seal embodying the present invention for providing a fluid seal within a rotary valve in combination with a selectively positionable valve seal member 2 located within a valve body 4. The selectively positionable member 2 may be the closure element of a so-called butterfly valve, such devices being well-known in the art, e.g., see U.S. Pat. No. 2,893,682.

The valve body 4 is provided with an annular recess 6 having a side wall 8 overlying a portion of a side face of an outwardly extending rib 9 on an annular valve seal ring 10. A coaxial opening 12 extending through the seal ring 10 provides a fluid flow path. A peripheral edge of the closure member 2 is arranged to contact a first face 11 of the seal ring 10 to close the coaxial opening through the seal ring 10 when the closure member 2 is in a valve closed position. An annular recess 14 is located in a second side face 13 of the seal 10 opposite to the first face 11 contacted by the valve closure member 2. A tapered surface 16 is provided on a side wall of the recess 14 extending substantially from the face of the seal 10 to the bottom of the recess 14.

An annular valve seat 18 is located within the valve body adjacent to the seal 10 and spaced therefrom. An annular ridge in the form of an outwardly projecting cantilever beam is located on an inner face of the valve seat 18 adjacent to the seal 10. The free end of the cantilever beam 20 is terminated in a tapered end face 22 arranged to mate with the tapered wall surface 16 of the recess 14. The valve seat 18 is also provided with a coaxial opening 24 to provide a fluid passage therethrough. The valve seat 18 is captured within the valve body 4 by a threaded retaining ring 26 having a coaxial opening 28 as a fluid passage therethrough. Thus, the valve seat ring 18 provides a fluid seal between the valve seat ring 18 and the valve body 4 by the pressure exerted by the retaining ring 26 which urges the valve seat ring 18 against a mating step leading to the recess 6. Additionally, the tapered side face 22 of the cantilever beam 20 is arranged to contact the tapered side wall 16 of the recess 14 to provide a fluid-tight seal therebetween.

As shown in FIG. 1, the seal 10 is located with the rib 9 abutting the side wall 8 of the recess 6 during a valve open condition. In this position of the seal 10, the tapered face 22 is located near the outside end of the tapered side wall 16 adjacent to the second side face 13 of the seal 10. In this condition, the fluid controlled by the valve would flow through the channel provided by the coaxial openings 12, 24 and 28.

Figure 2:
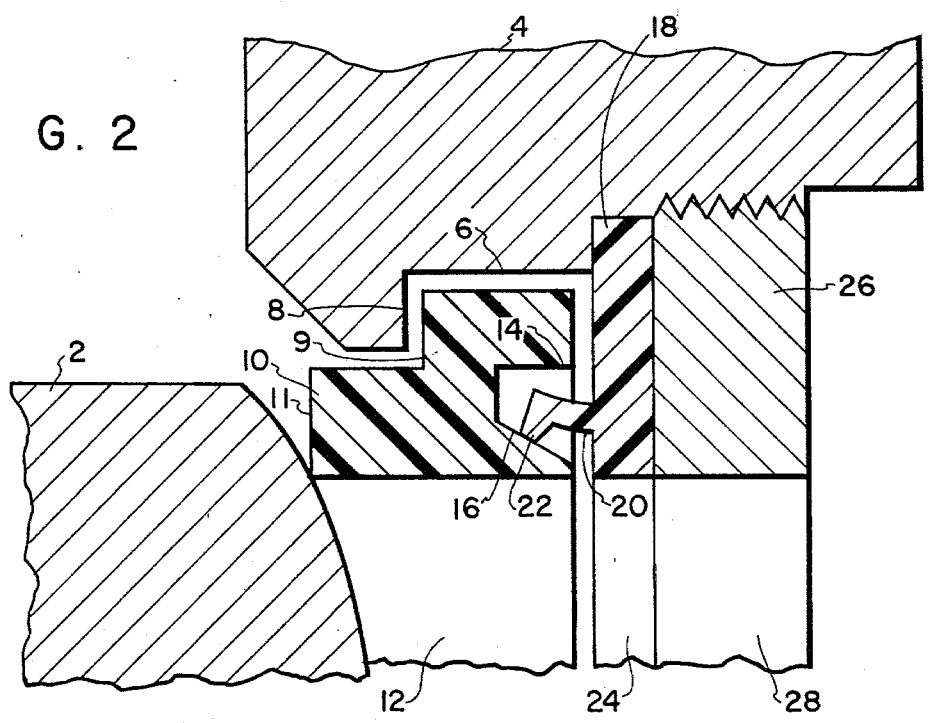
Figure 3:
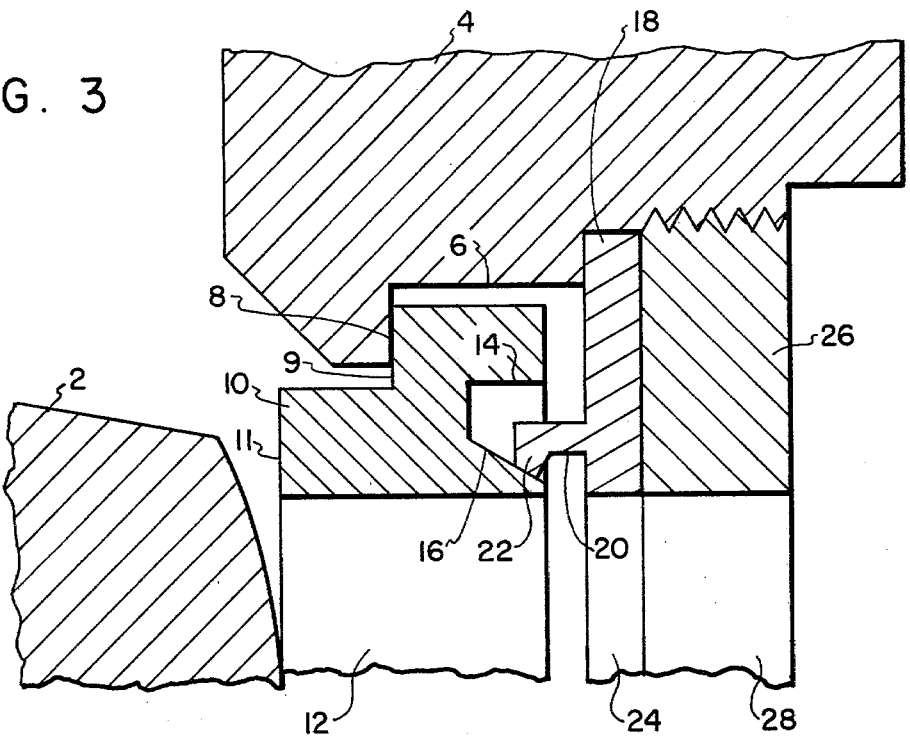
Figure 4:
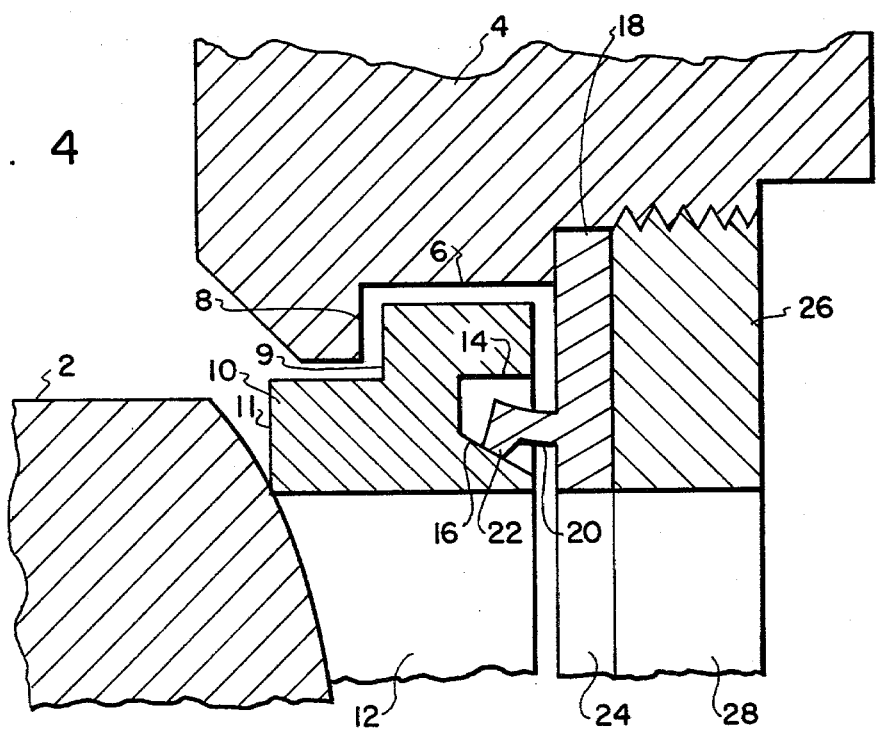

In FIG. 2, there is shown a valve closed condition of the valve wherein the valve closure member 2 has a peripheral edge in contact with a corner of the first face 11 of the seal 10. In this state of the valve, the seal 10 is displaced during the closure operation by the closure member 2 toward the valve seat 18 whereby the annular rib 9 is spaced from the side wall 8 of the recess 6. Since the seal ring 10 is loosely captured, i.e., "free floating", it is able to position itself accurately on the closure member 2 in a coaxial relationship, i.e., self-centering. The aforesaid displacement of the seal ring 10 by the closure member 2 produces a movement of the tapered face 22 of the cantilever beam 20 on the tapered side wall 16 of the recess 14. However, during this motion the fluid-tight engagement of the tapered face 22 with the tapered side wall 16 is maintained. The end position of the tapered face 22 on the tapered wall is dependent on the ability of the seal ring 10 to accommodate the mechanical eccentricities leading to the valve closed state of the closure member 2. Thus, in the valve closed condition, a fluid tight seal is provided within the valve between the closure member 2 and the seat ring 18. The seal ring 10 and the valve seat 18 may advantageously be made of a rigid and resilient material to maintain the aforesaid fluid-tight seal in the presence of a high-temperature environment, e.g., stainless steel.

Accordingly, it may be seen that there has been provided, in accordance with the present invention, an improved valve seal for a rotary valve.

The embodiments of the invention in which an exclusive property or privilege is claimed are defined as follows:

1. A valve seal for a rotary valve comprising
    a valve body having a fluid passage therethrough,
    a valve closure member selectively positionable in said fluid passage between a valve open state and a valve closed state and having a peripheral edge adjacent to a wall of said passage in the valve closed state,
    a valve seal ring loosely captured within an annular recess in the wall of said passage and having a first side face in contact with said peripheral edge in the valve closed state and a second side face with an annular coaxial recess having a tapered side wall, and a valve seat fixedly captured in said valve body adjacent to said seal ring and spaced therefrom and having an outwardly projecting annular coaxial ridge having a tapered face on a free end of said ridge, said ridge extending substantially perpendicularly from the fixedly captured portion of said valve seat, said tapered face contacting said tapered side wall to provide a fluid-tight seal therebetween, the relationship between said valve seal ring and said annular recess allowing movement of said valve seal ring both axially and radially of said fluid passage, said movement limited by (1) the dimensions of said annular recess and (2) the degree of resiliency of said tapered face.

2. A valve seal as set forth in claim 1 and including a lock ring for capturing said valve seat in said valve body to provide a fluid-tight seal between said valve seat and said valve body.

3. A valve seal as set forth in claim 2 wherein said valve seal ring, said valve seat and said lock ring are coaxial with said fluid passage.

4. A valve seal as set forth in claim 1 wherein said valve seal ring and said valve seat are made of metal.

5. A valve seal as set forth in claim 1 and further including an annular rib on an edge of said seal ring located within said annular recess.

6. A valve seal as set forth in claim 5 wherein said annular rib is arranged to contact an adjacent wall of said annular recess during a valve open state of said valve closure member and to be spaced from said wall of said annular recess during a valve closed state of said valve closure member.

7. A valve seal as set forth in claim 1 wherein said valve seal ring and said valve seat are coaxial with said fluid passage.

8. A valve seal as set forth in claim 1 wherein said tapered side wall has a tapered surface length for accommodating a contacting movement of said tapered face on said coaxial ridge during a movement of said valve closure member between said valve open state and said valve close state.

9. A valve seal as set forth in claim 1 wherein said tapered face on said free end of said ridge is located on a side of said ridge to produce a bending of said ridge as a cantilever beam during a movement of said valve closure member between said valve open state and a valve closed state.

10. A valve seal as set forth in claim 9 wherein said valve seal ring and said valve seat are coaxial with said fluid passage.

* * * * *